M. VALENTINE.
INSTRUCTIVE GAME.
APPLICATION FILED OCT. 14, 1915.
1,172,848.
Patented Feb. 22, 1916.
*Fig. 1.*
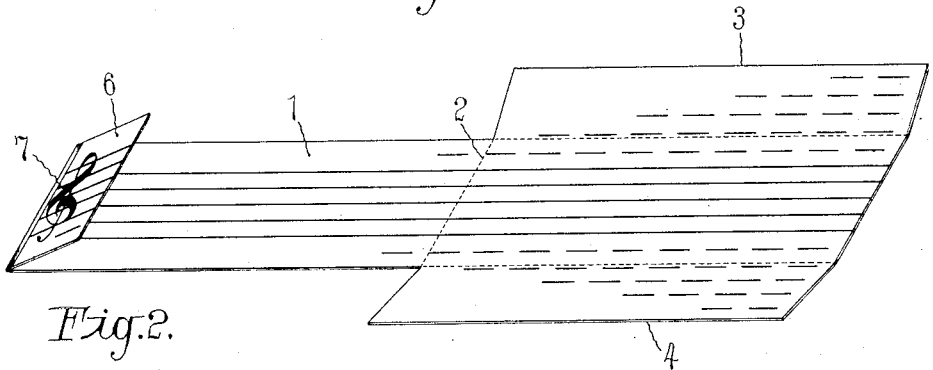
*Fig. 2.*
*Fig. 3.*
*Fig. 4.* *Fig. 5.* *Fig. 6.* *Fig. 7.* *Fig. 8.*
    
*Fig. 9. Fig. 10. Fig. 11. Fig. 12. Fig. 13. Fig. 14. Fig. 15.*
Witness:
Harry G. Fleischer
Inventor:
May Valentine
by her attorneys
Brown & Seward
THE COLUMBIA PLANOGRAPH CO., WASHINGTON, D. C.

UNITED STATES PATENT OFFICE.

MAY VALENTINE, OF NEW YORK, N. Y.

INSTRUCTIVE GAME.

1,172,848.  Specification of Letters Patent.  Patented Feb. 22, 1916.

Application filed October 14, 1915. Serial No. 55,829.

*To all whom it may concern:*

Be it known that I, MAY VALENTINE, a citizen of the United States, and resident of the borough of Manhattan, in the city and State of New York, have invented a new and useful Improvement in Instructive Games, of which the following is a specification.

This invention relates to an instructive game and more particularly to a game adapted to be utilized in giving instruction relating to the art of music.

Still more specifically, it relates to teaching piano forte.

The object of the invention is to provide means whereby the music may be effectively taught, particularly to children of tender years, and in a manner which will serve to hold the attention of the pupil and impart visual and graphic understanding of the elementals of music, their relationship, and manner of expression in written music.

Another object is to provide facilities for instructing a number of pupils at the same time.

A further object is to provide a device which is light and compact and may be readily carried from place to place by the teacher.

A still further object is to provide certain improvements in the form and arrangement of the several parts of the apparatus whereby the above mentioned and other objects may be effectively attained.

A practical embodiment of my invention is represented in the accompanying drawings, in which—

Figure 1 represents a perspective view of the panels charted with the staff and clef sign, Fig. 2 represents a detail perspective view of part of the said panel, Fig. 3 represents a perspective view of the panel charted with the piano keyboard, Figs. 4 to 15 represent various signs used in expressing music.

As will be understood from the foregoing description of figures, the apparatus includes panels which are charted in a certain manner and individual articles representing the various signs used in the visual expression of music.

I provide a panel, denoted by 1, which may be composed of suitable sheet material, such, for instance, as reasonably stiff cardboard. This panel 1 may be severed and hinged, as denoted at 2, in order to permit it to be folded compactly. The hinge may be suitably constructed by gluing a strip of cloth or other flexible material of sufficient strength along the abutting ends of the two halves of the panel 1, in a familiar manner. This panel 1 is charted so as to cause it to represent what is known in music as the staff; and this charting may simply consist of ink lines suitably placed and spaced, as is done in the writing of music. This charting of the panel 1 is plainly shown in Fig. 1. One half of the panel 1 is provided with upper and lower wings 3 and 4, which may be composed of the same material as the panel and be hinged thereto in the manner described with reference to hinging the two parts of the panel to each other. These wings 3 and 4 are charted or lined so as to represent the so-called leger lines which are positioned, in writing music, above and below the staff. At one end of the panel 1, to wit, at the left hand end, as shown in the drawings, the panel is provided with a sign to represent the clef, for instance the bass clef, as shown at 5 in Fig. 2. This end of the panel 1 also has a small flap 6 hinged thereto in the same manner that the wings 3, 4, are hinged to the panel; which flap has inscribed on its outer surface another clef sign, such, for instance, as the treble clef sign, as shown at 7. Furthermore, this flap 6 is designed, when folded down upon the panel 1, to cover and hide from view the clef sign, such as the clef sign 5, inscribed upon the panel. I also provide another panel 8 which may be composed of the same material as that just described, and which is charted to represent the piano keyboard. This panel may also be hinged in the manner set forth above, as indicated at 9, so that it may be folded for the sake of compactness.

The music signs represented in Figs. 4 to 8 inclusive, and which need not be described in detail because the character of each is clearly represented in the drawings, may be composed of sheet material, and preferably of such cardboard as that used in making the panels shown in Figs. 1 to 3. The signs shown in Figs. 9 to 15 inclusive, the character of which is also obvious in the drawings, may preferably be composed of sheet metal, from which material they can readily be stamped.

Broadly speaking, the apparatus is utilized by having the pupils construct, compose or write music, by placing the appropriate notes and signs in their proper places upon either the panel showing the staff or the panel showing the piano keyboard or both; the pupils being required to select the clef sign, the key sign and the time sign; and then to build up the music, measure by measure, taking care to observe the limitations of clef, key and time originally selected.

The desired clef sign may be selected by either unfolding or folding the wing 6; or an appropriate separable clef sign may be placed upon the panel if desired.

It will be understood that the signs represented in Figs. 4 to 15 inclusive, are merely illustrative, and that a complete equipment would consist of any desired number of each and every sign used in written music; all of which are, of course, entirely familiar to those having an understanding of, and particularly a teaching knowledge of the art of music. Furthermore, in using the apparatus the difficulty of the instructive game or lesson may be regulated at will by regulating the variety of musical signs dealt to the pupil to be placed in proper position; or by regulating the difficulty of the key, particularly with reference to the number of sharps or flats, or in any other manner which the tastes of the individual teacher may direct.

There are several plans which I have in mind and which I have followed in utilizing this apparatus in the teaching of music, but it is not deemed appropriate to describe them herein as the particular manner of using the apparatus forms no part of its mechanical structure, appearance or combination.

From the foregoing description, it will be observed that when it is desired to transport the apparatus, all the characters or signs employed, illustrated by Figs. 4 to 15 inclusive, may be placed upon one part of the panel 1, the wings 3 and 4 and the flap 6 folded down upon the panel, and the panel then folded together at its hinge point 2.

The keyboard panel shown in Fig. 3 may then be folded at its hinge point 9 and placed upon the folded staff panel. The two panels may then be either secured together or placed in a suitable case; in which form they are very compact and light so that their transportation constitutes no appreciable inconvenience to the instructor.

It will be understood that various changes may be resorted to in the form, construction, number and arrangement of the several parts without departing from the spirit and scope of my invention; hence I do not intend to be limited to the specific details herein shown and described except as they may be set forth in the claims.

What I claim is:—

1. A device of the character described comprising a panel charted to represent the staff, another panel charted to represent the piano keyboard, and movable pieces representing musical signs or characters, whereby said pieces may be placed upon said staff or keyboard to indicate the proper location and arrangement of the characters.

2. A device of the character described comprising a panel charted to represent the staff, and foldable wings secured to said panel, said wings being charted to represent the leger lines.

3. A device of the character described comprising a foldable panel charted to represent the staff, and foldable wings secured to the said panel, said wings being charted to represent the leger lines.

4. A device of the character described comprising a panel charted to represent the staff, and a foldable flap secured to said panel, said flap being charted to represent a clef.

5. A device of the character described comprising a panel charted to represent the staff and a clef, and a foldable flap secured to said panel and charted to represent a different clef.

6. A device of the character described comprising a panel charted to represent the staff, foldable wings secured to said panel, said wings being charted to represent the leger lines, and a foldable flap also secured to the panel, said flap being charted to represent a clef.

7. A device of the character described comprising a panel charted to represent the staff and a clef, foldable wings secured to said panel, said wings being charted to represent the leger lines, and a foldable flap also secured to the panel, said flap being charted to represent a different clef.

In testimony, that I claim the foregoing as my invention, I have signed my name this 13th day of October 1915.

MAY VALENTINE.

Copies of this patent may be obtained for five cents each, by addressing the "Commissioner of Patents, Washington, D. C."